(12) United States Patent
Ko

(10) Patent No.: US 9,180,831 B2
(45) Date of Patent: Nov. 10, 2015

(54) DRIVER AIRBAG APPARATUS

(71) Applicant: HYUNDAI MOBIS Co., Ltd., Yongin-si, Gyeonggi-do (KR)

(72) Inventor: Seok Hoon Ko, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/552,585

(22) Filed: Nov. 25, 2014

(65) Prior Publication Data

US 2015/0151704 A1 Jun. 4, 2015

(30) Foreign Application Priority Data

Nov. 29, 2013 (KR) .................. 10-2013-0147688

(51) Int. Cl.
*B60R 21/215* (2011.01)
*B60R 21/203* (2006.01)

(52) U.S. Cl.
CPC ............. *B60R 21/215* (2013.01); *B60R 21/203* (2013.01); *B60R 21/2035* (2013.01); *B60R 2021/21506* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,840,152 A * | 10/1974 | Hodge | ............... | 220/783 |
| 4,212,415 A * | 7/1980 | Neely | ............... | 222/231 |
| 4,840,286 A * | 6/1989 | Heberling et al. | ......... | 220/4.02 |
| 4,852,792 A * | 8/1989 | Hale | ............... | 229/5.5 |
| 5,100,015 A * | 3/1992 | Vanderstuyf | ......... | 220/326 |
| 5,460,400 A * | 10/1995 | Davidson | ......... | 280/728.2 |
| 5,551,589 A * | 9/1996 | Nakamura | ......... | 220/326 |
| 5,577,779 A * | 11/1996 | Dangel | ............... | 292/80 |
| 5,829,777 A * | 11/1998 | Sakurai et al. | ......... | 280/728.2 |
| 5,931,514 A * | 8/1999 | Chung | ............... | 292/89 |
| 6,149,192 A * | 11/2000 | Swann et al. | ......... | 280/740 |
| 6,173,987 B1 * | 1/2001 | Terasawa et al. | ......... | 280/728.2 |
| 6,296,270 B1 * | 10/2001 | Amamori | ......... | 280/728.2 |
| 6,318,585 B1 * | 11/2001 | Asagiri et al. | ......... | 220/788 |
| 6,409,208 B1 * | 6/2002 | Frisch et al. | ......... | 280/728.2 |
| 6,419,261 B1 * | 7/2002 | Ibe | ............... | 280/728.2 |
| 6,581,958 B2 * | 6/2003 | Holtz | ............... | 280/728.3 |
| 6,702,319 B2 * | 3/2004 | Sczeburek et al. | ......... | 280/728.3 |
| 6,959,943 B2 * | 11/2005 | Steimke | ......... | 280/728.2 |
| 6,994,372 B2 * | 2/2006 | Ford et al. | ......... | 280/731 |
| 7,261,317 B2 * | 8/2007 | Amamori | ......... | 280/731 |
| 7,413,479 B1 * | 8/2008 | Volpone | ......... | 439/692 |
| 7,708,309 B2 * | 5/2010 | Kim et al. | ......... | 280/731 |
| 7,841,618 B2 * | 11/2010 | Idomoto et al. | ......... | 280/728.3 |
| 7,922,194 B2 * | 4/2011 | Andersson et al. | ......... | 280/731 |
| 8,113,540 B2 * | 2/2012 | No | ............... | 280/731 |
| 8,205,908 B2 * | 6/2012 | Matsu et al. | ......... | 280/728.2 |
| 8,360,463 B2 * | 1/2013 | Isayama et al. | ......... | 280/728.3 |
| 8,491,002 B2 * | 7/2013 | Schneider et al. | ......... | 280/728.3 |
| 8,511,707 B2 * | 8/2013 | Amamori et al. | ......... | 280/728.2 |
| 8,585,078 B1 * | 11/2013 | Witt et al. | ......... | 280/728.3 |
| 8,622,416 B2 * | 1/2014 | Bosch | ......... | 280/728.2 |

(Continued)

FOREIGN PATENT DOCUMENTS

WO WO 2014203683 A1 * 12/2014

*Primary Examiner* — Nicole Verley
(74) *Attorney, Agent, or Firm* — Paratus Law Group, PLLC

(57) ABSTRACT

According to a driver airbag apparatus according to an exemplary embodiment of the present invention, an airbag cover and an airbag housing are securely coupled to each other, and as a result, the airbag cover is not separated from the airbag housing by deployment force of an airbag when the airbag is deployed.

17 Claims, 5 Drawing Sheets

(56) References Cited

U.S. PATENT DOCUMENTS

| | | | |
|---|---|---|---|
| 8,827,306 B2* | 9/2014 | Iida et al. | 280/728.2 |
| 8,931,799 B2* | 1/2015 | Onohara | 280/731 |
| 9,016,719 B2* | 4/2015 | Amamori | 280/731 |
| 9,027,960 B1* | 5/2015 | Yoshida | 280/731 |
| 2014/0265261 A1* | 9/2014 | Surdu et al. | 280/728.2 |
| 2014/0352118 A1* | 12/2014 | Ko | 24/592.1 |
| 2015/0069739 A1* | 3/2015 | Oh et al. | 280/728.2 |

* cited by examiner (A)  (B)

DRIVER AIRBAG APPARATUS

CROSS-REFERENCE TO RELATED APPLICATIONS

The present application claims priority to Korean Patent Application Number 10-2013-0147688 filed Nov. 29, 2013, the entire contents of which the application is incorporated herein for all purposes by this reference.

TECHNICAL FIELD

The present invention relates to a driver airbag apparatus, and more particularly, to a driver airbag apparatus that is mounted on a steering wheel.

BACKGROUND

In general, a driver airbag apparatus, which protects a driver at the time of a vehicle accident, is mounted on a steering wheel of a vehicle.

The driver airbag apparatus includes an inflator which generates gas at the time of a vehicle accident, an airbag which is expanded and deployed by gas generated by the inflator and protects the driver using cushioning force, an airbag housing in which the airbag is inserted and disposed in a folded state, and an airbag cover which covers the airbag inserted into the airbag housing and is coupled to the airbag housing.

A tear line, which is torn by expansive force of the airbag, is formed in an inner surface of the airbag cover, such that the airbag tears the tear line while expanding, breaks through the airbag cover, and protects the driver.

However, there have been many instances in which the airbag cover is separated from the airbag housing by deployment force of the airbag while the tear line is torn by expansive force of the airbag, and strikes the driver.

SUMMARY

The present invention has been made in an effort to provide a driver airbag apparatus in which an airbag cover is not separated from an airbag housing by deployment force of an airbag when the airbag is deployed.

Technical problems of the present invention are not limited to the aforementioned technical problem, and other technical problems, which are not mentioned above, may be clearly understood by those skilled in the art from the following descriptions.

An exemplary embodiment of the present invention provides a driver airbag apparatus including: an airbag housing in which an airbag is disposed; a guide bar which is formed to protrude on an outer surface of the airbag housing, and forms a slot between the guide bar and the outer surface of the airbag housing; and an airbag cover which covers the airbag, surrounds the outer surface of the airbag housing, and has a rim that is inserted into the slot, in which the airbag cover has a first hook hole at a portion which is inserted into the slot, and the guide bar has a first hook projection which is inserted into the first hook hole.

Other detailed matters of the exemplary embodiment are included in the detailed description and the drawings.

According to the driver airbag apparatus according to the present invention, the airbag cover and the airbag housing may be conveniently assembled.

The airbag cover cannot be separated from the airbag housing by deployment force of the airbag when the airbag is deployed.

The effect of the present invention is not limited to the aforementioned effect, and other effects, which are not mentioned above, will be clearly understood by those skilled in the art from the claims.

DETAILED DESCRIPTION

Figure 1:
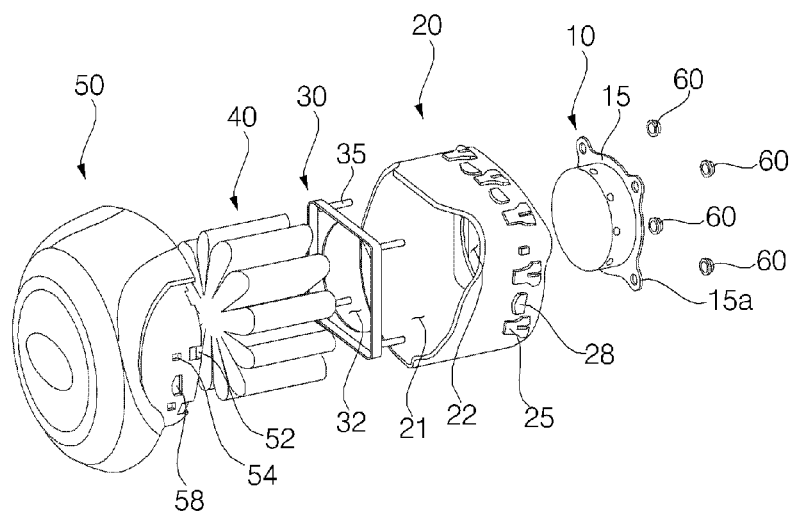
FIG. 1 is an exploded perspective view illustrating a driver airbag apparatus according to an exemplary embodiment of the present invention.

Advantages and features of the present invention and methods of achieving the advantages and features will be clear with reference to an exemplary embodiment described in detail below together with the accompanying drawings. However, the present invention is not limited to the exemplary embodiment set forth below, and may be embodied in various other forms. The present exemplary embodiment is for rendering the disclosure of the present invention complete and is set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, a driver airbag apparatus according to an exemplary embodiment of the present invention will be described with reference to the drawings.

FIG. 1 is an exploded perspective view illustrating a driver airbag apparatus according to an exemplary embodiment of the present invention.

Referring to FIG. 1, the airbag apparatus according to the exemplary embodiment of the present invention includes an inflator 10, an airbag housing 20, a retainer 30, an airbag 40, and an airbag cover 50. For ease of description, the airbag apparatus will be described by defining a side in a direction toward the airbag cover 50 in the drawings as an upper side, and defining a side in a direction toward the inflator 10 in the drawings as a lower side.

The inflator 10 is filled therein with a gas generating medium, which generates gas, and generates gas by explosion of the gas generating medium at the time of a vehicle accident. A flange 15 is formed to radially protrude on a circumferential surface of the inflator 10.

The airbag housing 20 is formed to have a vacant structure so as to accommodate the airbag 40. An upper side of the airbag housing 20 is opened to form an airbag insertion port 21 into which the airbag 40 is inserted, and an inflator insertion port 22 into which a head portion of the inflator 10 is inserted is formed at a lower side of the airbag housing 20.

The retainer 30 is inserted and disposed in the airbag 40. An inflator insertion port 32 into which the head portion of the inflator 10 is inserted is also formed in the retainer 30. Four fastening bolts 35 are disposed and protrude downward on the retainer 30 at the periphery of the inflator insertion port 32.

The fastening bolts 35 escape from the airbag 40 to the outside through fastening holes (not illustrated) formed in the airbag 40, escape from fastening holes (not illustrated) formed in the airbag housing 20, and then protrude to the lower side of the airbag housing 20. In this state, when the head portion of the inflator 10, which is positioned above the flange 15 of the inflator 10, is inserted into the inflator insertion port 22 formed in the airbag housing 20, the head portion of the inflator 10 is inserted into the inflator insertion port 32 formed in the retainer 30, and the head portion of the inflator 10 is disposed in the airbag 40. Further, the fastening bolts 35 are inserted into fastening holes 15a formed in the flange 15 of the inflator 10, and then fastened with nuts 60.

The airbag 40 is expanded by gas generated by the inflator 10 and protects a driver using cushioning force. The airbag 40 is made of a flexible material. The airbag 40 is folded in a radial shape, and inserted into the airbag housing 20 through the airbag insertion port 21 together with the retainer 30 when the fastening bolts 35 are inserted into the fastening holes formed in the airbag housing 20. Therefore, the airbag 40 is disposed in the airbag housing 20 in a folded state.

The airbag cover 50 covers the airbag 40 accommodated in the airbag housing 20, and is coupled to the airbag housing 20 while surrounding an outer surface of the airbag housing 20.

Figure 2:
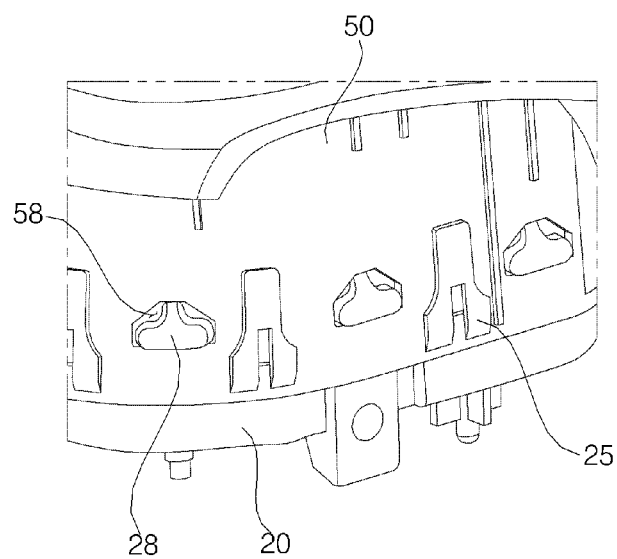
FIG. 2 is a coupled perspective view of a main part, illustrating the driver airbag apparatus according to the exemplary embodiment of the present invention.
Figure 3:
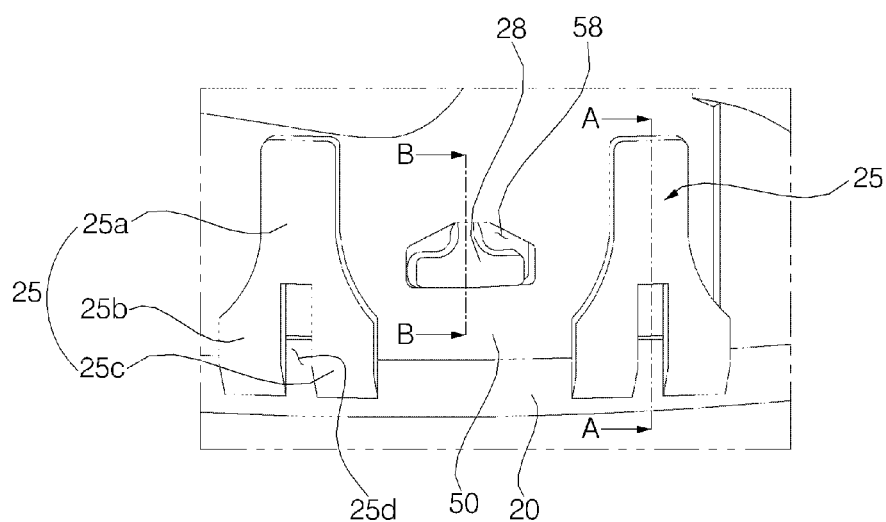
FIG. 3 is a partially enlarged view of FIG. 2.
Figure 4:
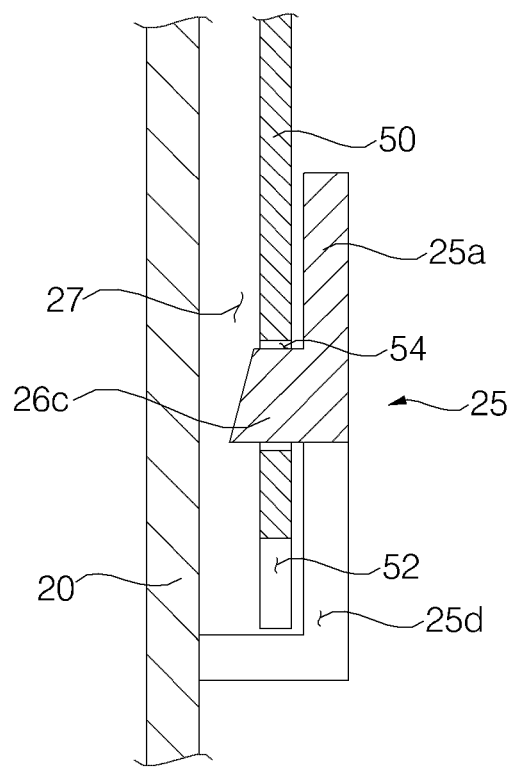
FIG. 4 is a cross-sectional view taken along line A-A of FIG. 3.

FIG. 2 is a coupled perspective view of a main part, illustrating the driver airbag apparatus according to the exemplary embodiment of the present invention, FIG. 3 is a partially enlarged view of FIG. 2, and FIG. 4 is a cross-sectional view taken along line A-A of FIG. 3.

Referring to FIGS. 1 to 4, guide bars 25 are formed to protrude on the outer surface of the airbag housing 20. Only a lower end of the guide bar 25 is formed to be extended from the airbag housing 20, and the rest of the guide bar 25 is disposed to be spaced apart from the airbag housing 20. Therefore, the guide bar 25 forms a slot 27 into which a rim of the airbag cover 50 is inserted, between the guide bar 25 and the outer surface of the airbag housing 20. That is, when the airbag cover 50 surrounds the outer surface of the airbag housing 20, a lower end of the airbag cover 50 is inserted into the slot 27 between the outer surface of the airbag housing 20 and the guide bar 25.

When the airbag cover 50 is about to be moved away from the airbag housing 20 by expansive force of the airbag 40, the guide bar 25 presses the outer surface of the airbag cover 50, thereby preventing the airbag cover 50 from being moved away from the airbag housing 20.

A first cut-out hole 52 is formed in the rim of the airbag cover 50 which is inserted into the slot 27. Further, a first hook hole 54, which is spaced apart from the first cut-out hole 52, is further formed in the airbag cover 50. The airbag cover 50 has the first hook hole 54 at a portion which is inserted into the slot 27. The first cut-out hole 52 is formed at the lower end of the airbag cover 50, and the first hook hole 54 is formed to be spaced apart upward from the first cut-out hole 52.

The guide bar 25 has a first hook projection 26c which is inserted into the first hook hole 54. Therefore, when the airbag 40 is expanded, the airbag cover 50 is caught by the guide bar 25 and prevented from being moved away from the airbag housing 20 even though the airbag cover 50 is about to be moved away from the airbag housing 20 by expansive force of the airbag 40, and the airbag cover 50 is caught by the first hook projection 26c and prevented from being separated from the airbag housing 20 even though the airbag cover 50 is about to be separated upward from the airbag housing 20.

A surface of the first hook projection 26c, which comes into contact with the airbag cover 50 inside the first hook hole 54, is formed in a rectilinear shape. Therefore, even though the airbag cover 50 is about to be separated upward from the airbag housing 20 by deployment force of the airbag 40, the airbag cover 50 is caught by the portion of the first hook projection 26c, which is formed in a rectilinear shape, and prevented from being separated from the airbag housing 20.

A surface of the first hook projection 26c, which is directed toward the airbag housing 20, is formed to be inclined. The inclined portion is formed to become distant from the airbag housing 20 toward the upper side thereof. Therefore, when the lower end of the airbag cover 50 is inserted into the slot 27 from the upper side of the airbag housing 20 while the airbag cover 50 surrounds the outer surface of the airbag housing 20, the airbag cover 50 is easily inserted into the slot 27 along the inclined surface of the first hook projection 26c, and spreading the guide bar 25.

A plurality of guide bars 25 is formed along a circumferential surface of the airbag housing 20, and disposed to be spaced apart from each other. A plurality of first cut-out holes 52 and a plurality of first hook holes 54 are also formed along a circumferential surface of the airbag cover 50 at positions that correspond to positions of the guide bars 25.

A second cut-out hole 25d, which is spaced apart downward from the first hook projection 26c, is further formed in the guide bar 25. The second cut-out hole 25d is formed at the lower end of the guide bar 25, such that even though the airbag cover 50 presses the guide bar 25 outward while being moved away from the airbag housing 20 by expansive force of the airbag 40, the guide bar 25 is not broken, and may press the airbag cover 50 inward.

The guide bar 25 includes an extended portion 25a on which the first hook projection 26c is formed, a first body portion 25b which branches off from the extended portion 25a and is formed to protrude from the outer surface of the airbag housing 20, and a second body portion 25c which branches off from the extended portion 25a and is formed to protrude from the outer surface of the airbag housing 20. The first body portion 25b and the second body portion 25c are disposed to be spaced apart from each other with the second cut-out hole 25d interposed therebetween. The first hook projection 26c is formed on the inner surface of the extended portion 25a that is positioned immediately above the second cut-out hole 25d.

Figure 5:
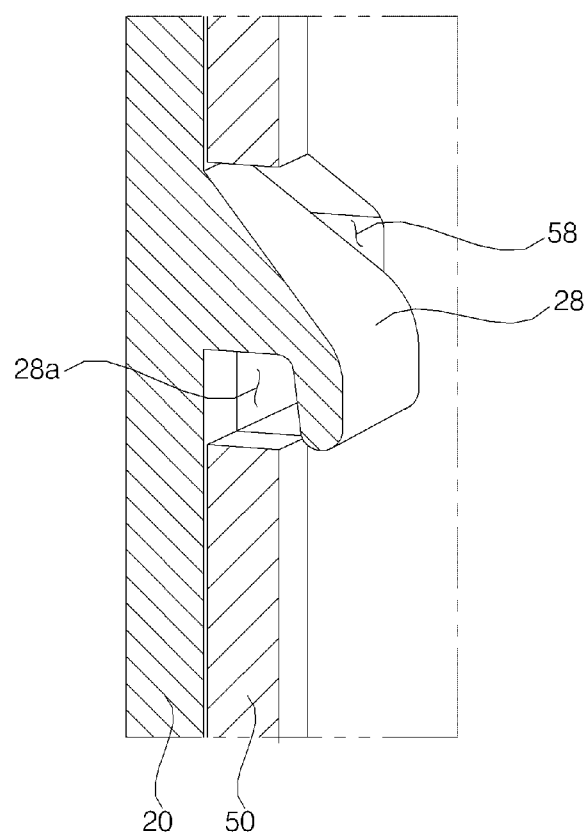
FIG. 5 is a cut-away perspective view taken along line B-B of FIG. 3.
Figure 6:
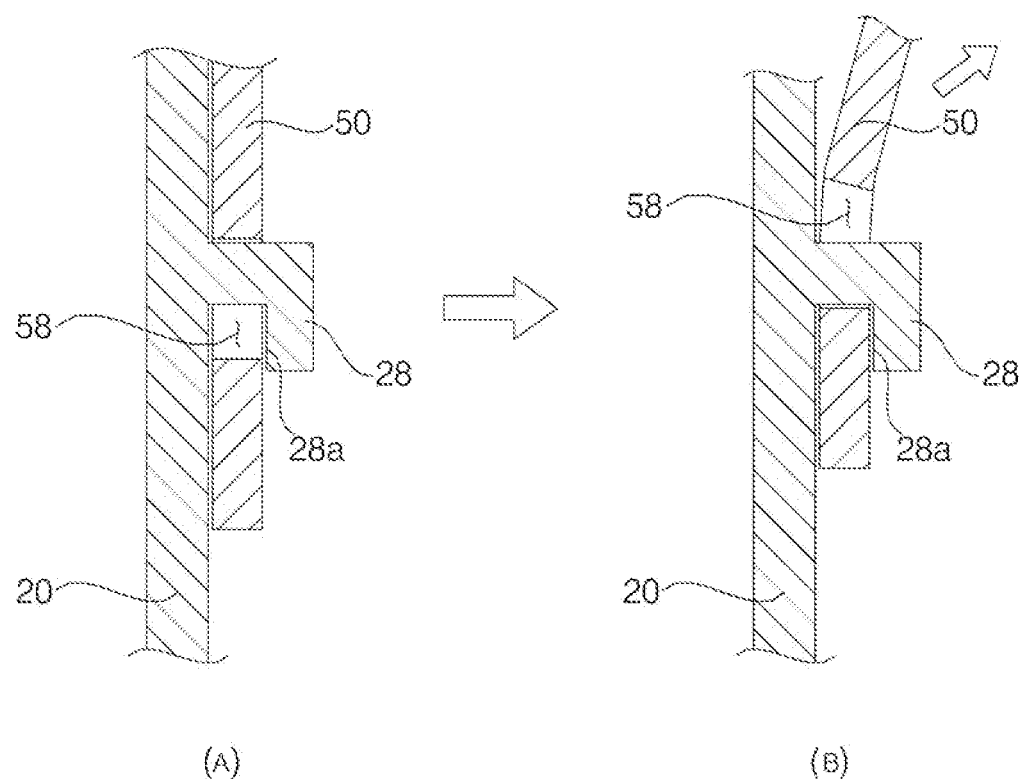
FIG. 6 is a view schematically illustrating FIG. 5, that is, a view for explaining an operation when the airbag is deployed.

FIG. 5 is a cut-away perspective view taken along line B-B of FIG. 3, and FIG. 6 is a view schematically illustrating FIG. 5, that is, a view for explaining an operation when the airbag is deployed.

Referring to FIGS. 1, 2, 3, 5 and 6, a second hook hole 58 is further formed in the airbag cover 50. A plurality of second hook holes 58 is formed along the circumferential surface of the airbag cover 50, and disposed to be spaced apart from each other.

A second hook projection 28, which is inserted into the second hook hole 58 and coupled to the airbag cover 50, is further formed on the outer surface of the airbag housing 20. A plurality of second hook projections 28 is formed along the circumferential surface of the airbag housing 20 at positions that correspond to positions of the second hook holes 58. The second hook projections 28 are disposed between the plurality of guide bars 25.

An insertion groove 28a into which the airbag cover 50 is inserted is formed in the second hook projection 28. In a state in which the second hook projection 28 is coupled to the airbag cover 50, the airbag cover 50 is disposed in a state in which the airbag cover 50 is not fully inserted into the insertion groove 28a. That is, a portion of the airbag cover 50, which is inserted into the insertion groove 28a, has an inner surface which is in contact with the airbag housing 20, an outer surface which is in contact with the second hook projection 28, and an upper surface which is disposed to be spaced apart from the second hook projection 28.

Before the airbag 40 is expanded, the airbag cover 50 is in a state as illustrated in FIG. 6A, and when the airbag 40 is expanded, as illustrated in FIG. 6B, the airbag cover 50 is moved away from the airbag housing 20 by expansive force of the airbag 40 in a direction indicated by an arrow, and receives force that allows the airbag cover 50 to be separated upward from the airbag housing 20. However, because the airbag cover 50 is inserted into the insertion groove 28a, the airbag cover 50 is not moved away from the airbag housing 20 anymore, and may not be moved upward, such that the airbag cover 50 is not separated from the airbag housing 20.

An operation of the driver airbag apparatus according to the exemplary embodiment of the present invention, which is configured as described above, will be described below.

First, a case in which the first hook hole 54 is formed in the airbag cover 50, and the guide bar 25 and the first hook projection 26c are formed on the airbag housing 20 in a state in which the airbag cover 50 has no second hook hole 58, and the airbag housing 20 has no second hook projection 28, will be described below.

When the airbag 40 begins to be expanded, the airbag cover 50 receives force that allows the airbag cover 50 to be moved away from the airbag housing 20, and receives force that allows the airbag cover 50 to be separated upward from the airbag housing 20.

Even though the airbag cover 50 is about to be separated from the airbag housing 20, the airbag cover 50 is pressed by the guide bar 25, such that the airbag cover 50 does not separate from the airbag housing 20 further.

Even though the airbag cover 50 is about to be separated upward from the airbag housing 20, the airbag cover 50 is caught by the lower surface of the first hook projection 26c formed on the guide bar 25 so as not to be moved upward anymore, such that the airbag cover 50 is not separated upward from the airbag housing 20.

Second, a case in which the second hook hole 58 is formed in the airbag cover 50, and the second hook projection 28 and the guide bar 25 are formed in the airbag housing 20 in a state in which the airbag cover 50 has no first hook hole 54, and the guide bar 25 has no first hook projection 26c, will be described below.

When the airbag 40 begins to be expanded, the airbag cover 50 receives force that allows the airbag cover 50 to be moved away from the airbag housing 20, and receives force that allows the airbag cover 50 to be separated upward from the airbag housing 20.

Even though the airbag cover 50 is about to be separated from the airbag housing 20, the airbag cover 50 is pressed by the guide bar 25, such that the airbag cover 50 does not separate from the airbag housing 20 further.

Even though the airbag cover 50 is about to be separated upward from the airbag housing 20, the airbag cover 50 is inserted into the insertion groove 28a formed in the second hook projection 28 so as not to be moved upward any more, such that the airbag cover 50 is not separated upward from the airbag housing 20.

Meanwhile, because in a case in which the first hook hole 54, and the second hook hole 58 are all formed in the airbag cover 50, and the guide bar 25, the first hook projection 26c, and the second hook projection 28 are all formed on the airbag housing 20, operations of the aforementioned first and second cases are combined, a description thereof will be omitted.

A process of assembling the airbag cover 50 to the airbag housing 20 will be described below.

When the upper surface of the airbag cover 50 is pressed after the airbag cover 50 surrounds the outer surface of the airbag housing 20, the lower end of the airbag cover 50 is inserted into the slot 27, and the first hook projection 26c is inserted into the first hook hole 54.

Thereafter, when the circumferential surface of the airbag cover 50 is pressed, the second hook projection 28 is inserted into the second hook hole 58, and as a result, a process of assembling the airbag cover 50 and the airbag housing 20 is completed.

As described above, according to the driver airbag apparatus according to the present invention, the airbag cover 50 and the airbag housing 20 may be easily assembled without using fastening members such as bolts and nuts.

Nevertheless, because the airbag cover 50 and the airbag housing 20 are securely coupled to each other, the airbag cover 50 is not separated from the airbag housing 20 by deployment force of the airbag 40 when the airbag 40 is deployed.

It may be understood by a person skilled in the art that the present invention may be implemented by other specific forms without changing the technical spirit or the essential characteristics. Thus, it should be appreciated that the exemplary embodiment described above is intended to be illustrative in every sense, and not restrictive. The scope of the present invention is represented by the claims to be described below rather than the detailed description, and it should be interpreted that all the changes or modified forms, which are derived from the meaning of the scope of the claims, the scope of the claims, and the equivalents thereto, are included in the scope of the present invention.

What is claimed is:

1. A driver airbag apparatus comprising:
an airbag housing in which an airbag is disposed;
a guide bar which is formed to protrude on an outer surface of the airbag housing, and forms a slot between the guide bar and the outer surface of the airbag housing; and
an airbag cover which covers the airbag, surrounds the outer surface of the airbag housing, and has a rim that is inserted into the slot,
wherein the airbag cover has a first hook hole at a portion which is inserted into the slot, and the guide bar has a first hook projection which is inserted into the first hook hole,
wherein a second hook hole having an outer circumference in a closed shape is formed in the airbag cover at a portion positioned outside the slot, and a second hook projection being separate from the guide bar is formed on the outer surface of the airbag housing such that the second hook projection is inserted into the second hook hole.

2. The driver airbag apparatus of claim 1, wherein a surface of the first hook projection, which comes into contact with the airbag cover inside the first hook hole, is formed in a rectilinear shape, and a surface of the first hook projection, which is directed toward the airbag housing, is formed to be inclined.

3. The driver airbag apparatus of claim 1, wherein a second cut-out hole, which is spaced apart from the first hook projection, is further formed in the guide bar.

4. The driver airbag apparatus of claim 3, wherein the guide bar includes:
an extended portion on which the first hook projection is formed;
a first body portion which branches off from the extended portion and is formed to protrude from the airbag housing; and a second body portion which branches off from the extended portion, is formed to protrude from the airbag housing, and is disposed to be spaced apart from the first body portion with the second cut-out hole interposed between the first body portion and the second body portion.

5. The driver airbag apparatus of claim 1, wherein an insertion groove into which the airbag cover is inserted is formed in the second hook projection.

6. The driver airbag apparatus of claim 5, wherein a portion of the airbag cover, which is inserted into the insertion groove, has an upper surface which is disposed to be spaced apart from the second hook projection.

7. The driver airbag apparatus of claim 1, wherein a plurality of guide bars is formed along a circumferential surface of the airbag housing, and the second hook projection is disposed between the plurality of guide bars.

8. A driver airbag apparatus comprising:
   an airbag housing in which an airbag is disposed;
   a guide bar which is formed to protrude on an outer surface of the airbag housing, and forms a slot between the guide bar and the outer surface of the airbag housing; and
   an airbag cover which covers the airbag, surrounds the outer surface of the airbag housing, and has a rim that is inserted into the slot,
   wherein a second hook hole having an outer circumference in a closed shape is formed in the airbag cover, and a second hook projection being separate from the guide bar, which is inserted into the second hook hole, is formed on the outer surface of the airbag housing, and an insertion groove into which the airbag cover is inserted is formed in the second hook projection.

9. The driver airbag apparatus of claim 8, wherein a portion of the airbag cover, which is inserted into the insertion groove, has an upper surface which is disposed to be spaced apart from the second hook projection.

10. The driver airbag apparatus of claim 8, wherein a plurality of guide bars is formed along a circumferential surface of the airbag housing, and the second hook projection is disposed between the plurality of guide bars.

11. The driver airbag apparatus of claim 8, wherein the airbag cover has a first hook hole at a portion which is inserted into the slot, and the guide bar has a first hook projection which is inserted into the first hook hole.

12. The driver airbag apparatus of claim 11, wherein a surface of the first hook projection, which comes into contact with the airbag cover inside the first hook hole, is formed in a rectilinear shape, and a surface of the first hook projection, which is directed toward the airbag housing, is formed to be inclined.

13. The driver airbag apparatus of claim 11, wherein a second cut-out hole, which is spaced apart from the first hook projection, is further formed in the guide bar.

14. The driver airbag apparatus of claim 13, wherein the guide bar includes:
   an extended portion on which the first hook projection is formed;
   a first body portion which branches off from the extended portion and is formed to protrude from the airbag housing; and
   a second body portion which branches off from the extended portion, is formed to protrude from the airbag housing, and is disposed to be spaced apart from the first body portion with the second cut-out hole interposed between the first body portion and the second body portion.

15. An airbag apparatus comprising:
   an airbag housing in which an airbag is disposed and including:
     a guide bar upwardly protruded from an outer surface of the airbag housing to form a first slot which is upwardly opened, and
     a hook protrusion being separate from the guide bar and downwardly protruded from the outer surface of the airbag housing to form a second slot which is downwardly opened; and
   an airbag cover which covers the airbag, and including:
     a rim surrounding an outer surface of the airbag housing and including a lower end inserted into the first slot, and
     a hook hole formed at the rim and having an outer circumference in a closed shape, wherein the hook projection is inserted into the hook hole.

16. The airbag apparatus of claim 15, wherein a portion of the airbag, adjacent to the hook hole, has an upper surface disposed to be spaced apart from the hook projection when the airbag cover is coupled to the airbag housing,
   wherein the upper surface is inserted into the second slot when the airbag cover moves up by a deployment of the airbag.

17. The airbag apparatus of claim 15, wherein the lower end of the rim includes a hole at a portion which is inserted into the first slot, and the guide bar includes a hook which is protruded from an inner surface of the guide bar toward the outer surface of the airbag housing and inserted into the hole of the lower end of the rim.

* * * * *